(12) United States Patent
Wu et al.

(10) Patent No.: US 12,572,036 B2
(45) Date of Patent: Mar. 10, 2026

(54) OPTICAL TRANSMITTER AND OPTICAL TRANSMISSION METHOD

(71) Applicant: NEC Corporation, Tokyo (JP)

(72) Inventors: Mingqi Wu, Tokyo (JP); Emmanuel Le Taillandier De Gabory, Tokyo (JP); Kazushi Muraoka, Tokyo (JP); Masaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 18/266,430

(22) PCT Filed: Dec. 25, 2020

(86) PCT No.: PCT/JP2020/048781
§ 371 (c)(1),
(2) Date: Jun. 9, 2023

(87) PCT Pub. No.: WO2022/137517
PCT Pub. Date: Jun. 30, 2022

(65) Prior Publication Data
US 2024/0045238 A1     Feb. 8, 2024

(51) Int. Cl.
*G02F 1/01*          (2006.01)
*G02B 27/10*       (2006.01)
*H04B 10/50*       (2013.01)

(52) U.S. Cl.
CPC ......... *G02F 1/0123* (2013.01); *G02B 27/106* (2013.01); *H04B 10/5053* (2013.01)

(58) Field of Classification Search
CPC .. G02F 1/0123; H04B 10/5053; G02B 27/106

USPC ......................................................... 398/141
See application file for complete search history.

(56) References Cited

U.S. PATENT DOCUMENTS

| | | | | |
|---|---|---|---|---|
| 11,159,242 B2 * | 10/2021 | Kawakami | ........... | H04B 10/548 |
| 11,888,526 B2 * | 1/2024 | Murakami | .............. | G02F 1/212 |
| 2004/0028418 A1 | 2/2004 | Kaplan et al. | | |

(Continued)

FOREIGN PATENT DOCUMENTS

| | | |
|---|---|---|
| CN | 106154592 A | 11/2016 |
| JP | 2012-042796 A | 3/2012 |

(Continued)

OTHER PUBLICATIONS

Lui et al; Experimental evaluation of a digitized fiber-wireless system employing sigma delta modulation; Jul. 2014, OSA, pp. 1-16. (Year: 2014).*

(Continued)

*Primary Examiner* — Amritbir K Sandhu
(74) *Attorney, Agent, or Firm* — Sughrue Mion, PLLC

(57)          ABSTRACT

It is difficult to carry out automatic bias control to an optical modulator without a dither signal with a simple configuration, therefore, an optical transmitter comprising the controller configured to adjust an adjusted bias voltage based on the coupled optical signal, the adjusted bias voltage being one of a first bias voltage applied to the first optical modulator, a second bias voltage applied to the second optical modulator and a third bias voltage applied to the third optical modulator and maintain a value of bias voltages other than the adjusted voltage in the first bias voltage, the second bias voltage and the third voltage.

13 Claims, 11 Drawing Sheets

(56) References Cited

U.S. PATENT DOCUMENTS

| | | | | |
|---|---|---|---|---|
| 2010/0021182 A1* | 1/2010 | Asano | ................ | H04B 10/5561 |
| | | | | 398/188 |
| 2012/0207483 A1 | 8/2012 | Cui et al. | | |
| 2014/0029956 A1* | 1/2014 | Le Taillandier De Gabory | .......... | |
| | | | | H04B 10/50595 |
| | | | | 398/186 |
| 2014/0037286 A1* | 2/2014 | Krasulick | ........ | H04B 10/07955 |
| | | | | 398/38 |
| 2014/0334829 A1* | 11/2014 | Akiyama | ......... | H04B 10/50575 |
| | | | | 398/186 |
| 2015/0171971 A1* | 6/2015 | Enoki | ............. | H04B 10/50575 |
| | | | | 398/183 |
| 2017/0227796 A1* | 8/2017 | Choi | ............... | H04B 10/50575 |
| 2018/0031870 A1 | 2/2018 | Griffin et al. | | |
| 2019/0115980 A1 | 4/2019 | Ikeda | | |
| 2020/0274621 A1* | 8/2020 | Yamanaka | ......... | H04B 10/5053 |
| 2024/0045238 A1* | 2/2024 | Wu | ...................... | G02B 27/106 |

FOREIGN PATENT DOCUMENTS

| | | | | |
|---|---|---|---|---|
| JP | 2014146915 A | * | 8/2014 | |
| JP | 2018-505449 A | | 2/2018 | |
| WO | WO-2012144082 A1 | * | 10/2012 | ....... H04B 10/50595 |

OTHER PUBLICATIONS

International Search Report for PCT Application No. PCT/JP2020/048781, mailed on Mar. 23, 2021.

English translation of Written opinion for PCT Application No. PCT/JP2020/048781, mailed on Mar. 23, 2021.

* cited by examiner

Fig.1

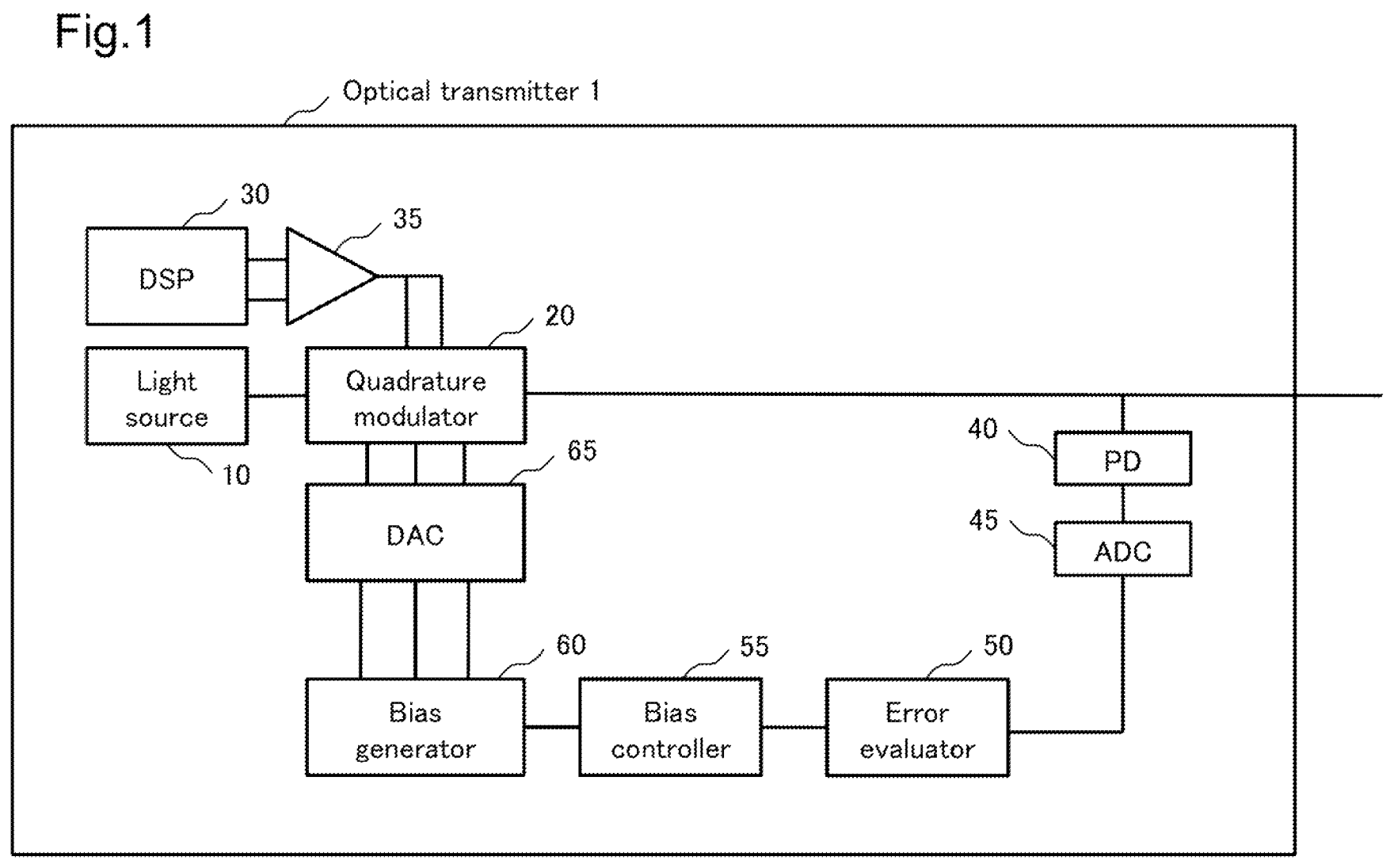

Optical transmitter 1

DSP 30

Light source 10

35

Quadrature modulator 20

PD 40

ADC 45

Error evaluator 50

DAC 65

Bias controller 55

Bias generator 60

Optical transmitter 3

Fig.11

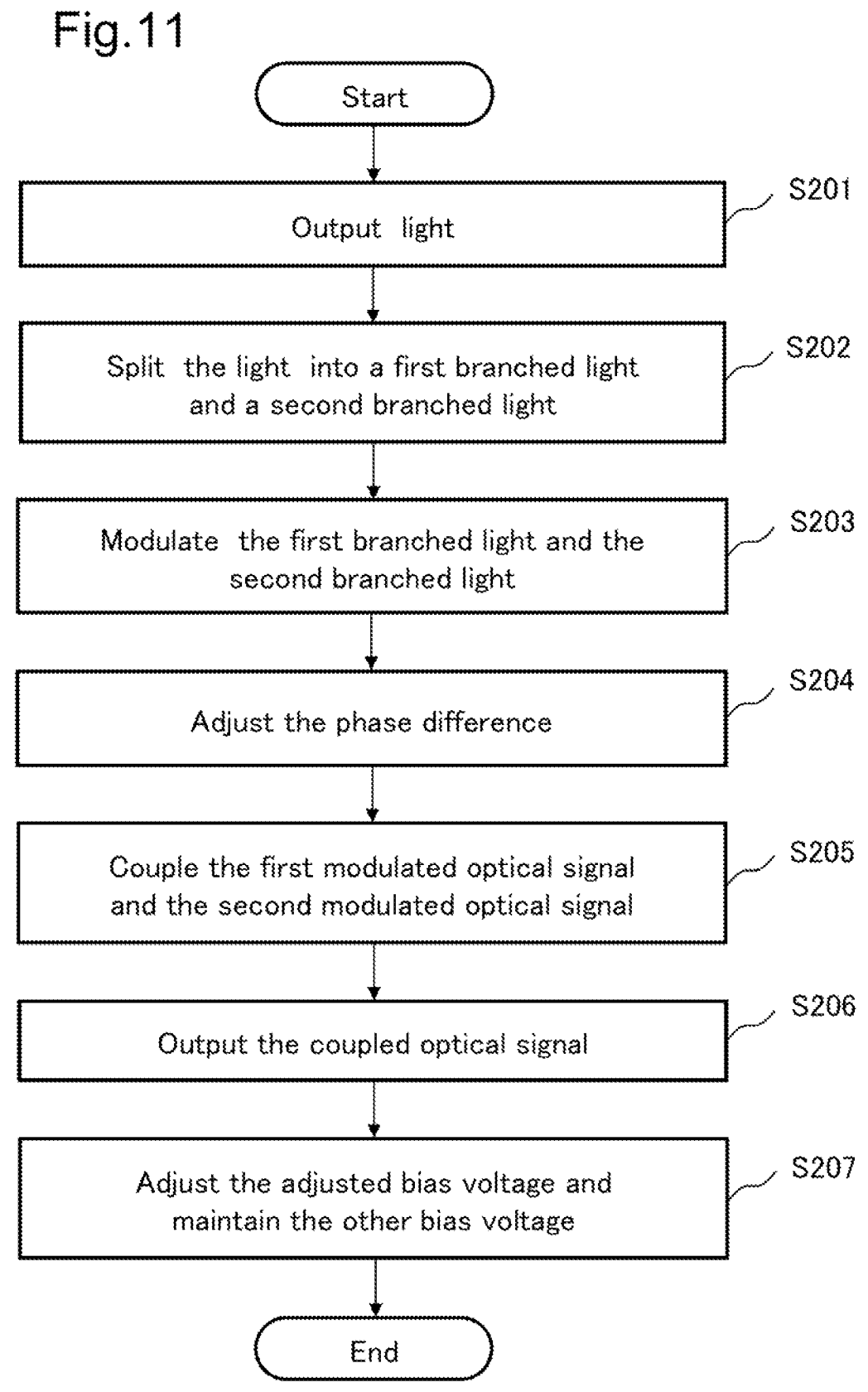

Start

S201
Output light

S202
Split the light into a first branched light and a second branched light

S203
Modulate the first branched light and the second branched light

S204
Adjust the phase difference

S205
Couple the first modulated optical signal and the second modulated optical signal S206
Output the coupled optical signal S207
Adjust the adjusted bias voltage and maintain the other bias voltage End

OPTICAL TRANSMITTER AND OPTICAL TRANSMISSION METHOD

This application is a National Stage Entry of PCT/JP2020/048781 filed on Dec. 25, 2020, the contents of all of which are incorporated herein by reference, in their entirety.

TECHNICAL FIELD

The present invention relates to an optical transmitter and a method of transmitting optical signal, in particular, to carry out automatic bias control to an optical modulator without a dither signal with a simple configuration.

BACKGROUND ART

In an optical communication network, an optical transmitter outputs an optical signal modulated based on a drive voltage by an optical modulator. Quality of the optical signal is deteriorated by operation point fluctuation caused by temperature fluctuation and aging deterioration of the optical modulator. In order to suppress the operation point fluctuation, automatic bias control using a low frequency dither signal is adopted to the optical modulator. In the case of using the low frequency dither signal, however, an amplitude of a voltage applied to the optical modulator is changed by the low frequency dither signal and thereby the quality of the optical signal is deteriorated.

Patent Literature 1 (PTL1) discloses a method for controlling, in a modulator comprising a plurality of modulation region modulating optical signals, a plurality of bias voltages applied to the plurality of modulation region without the dither signal.

CITATION LIST

Patent Literature

PTL1: Japanese Unexamined Patent Application Publication No 2018-505449

SUMMARY OF INVENTION

Technical Problem

On the other hand, the structure of the modulator disclosed in PTL1 is complex, because it is necessary to arrange photodetectors for all modulation regions.

An exemplary object of the invention is to provide an optical transmitter and a method of transmitting optical signal, in particular, to carry out automatic bias control to an optical modulator without a dither signal with a simple configuration.

Solution to Problem

An optical transmitter according to an exemplary aspect of the invention comprises;

a light source configured to output light;

a splitter configured to split the light to a first branched light and a second branched light;

a first optical modulator configured to modulate the first branched light and output a first modulated optical signal;

a second optical modulator configured to modulate the second branched light and output a second modulated optical signal;

a third optical modulator configured to adjust a phase difference between the first modulated optical signal and the second modulated optical signal;

a coupler configured to couple the first modulated optical signal and the second modulated optical signal and output a coupled optical signal; and a controller configured to adjust an adjusted bias voltage based on the coupled optical signal, the adjusted bias voltage being one of a first bias voltage applied to the first optical modulator, a second bias voltage applied to the second optical modulator and a third bias voltage applied to the third optical modulator, wherein the controller maintains a value of bias voltages other than the adjusted voltage in the first bias voltage, the second bias voltage and the third voltage.

An optical transmission method according to an exemplary aspect of the invention comprises;

outputting light;

splitting the light to a first branched light and a second branched light;

modulating the first branched light and outputting a first modulated optical signal by a first optical modulator;

modulating the second branched light and outputting a second modulated optical signal by a second optical modulator;

adjusting a phase difference between the first modulated optical signal and the second modulated optical signal by a third optical modulator, coupling the first modulated optical signal and the second modulated optical signal and outputting a coupled optical signal, adjusting an adjusted bias voltage based on the coupled optical signal, the adjusted bias voltage being one of a first bias voltage applied to the first optical modulator, a second bias voltage applied to the second optical modulator and a third bias voltage applied to the third optical modulator; and maintaining a value of bias voltages other than the adjusted voltage in the first bias voltage, the second bias voltage and the third voltage.

Advantageous Effects of Invention

An exemplary advantage according to the present invention is carrying out automatic bias control to an optical modulator without a dither signal with a simple configuration.

BRIEF DESCRIPTION OF DRAWINGS

FIG. 1 is a block diagram illustrating configuration example of an optical transmitter in accordance with a first example embodiment of the present invention.

FIG. 2 is a drawing for explaining the optical transmitter in accordance with a first example embodiment of the present invention.

FIG. 10 is a block diagram illustrating configuration example of an optical transmitter in accordance with a third example embodiment of the present invention.

FIG. 11 is a flowchart for explaining an operation of the optical transmitter in accordance with a third example embodiment of the present invention.

DESCRIPTION OF EMBODIMENTS

First Example Embodiment

Figure 3:
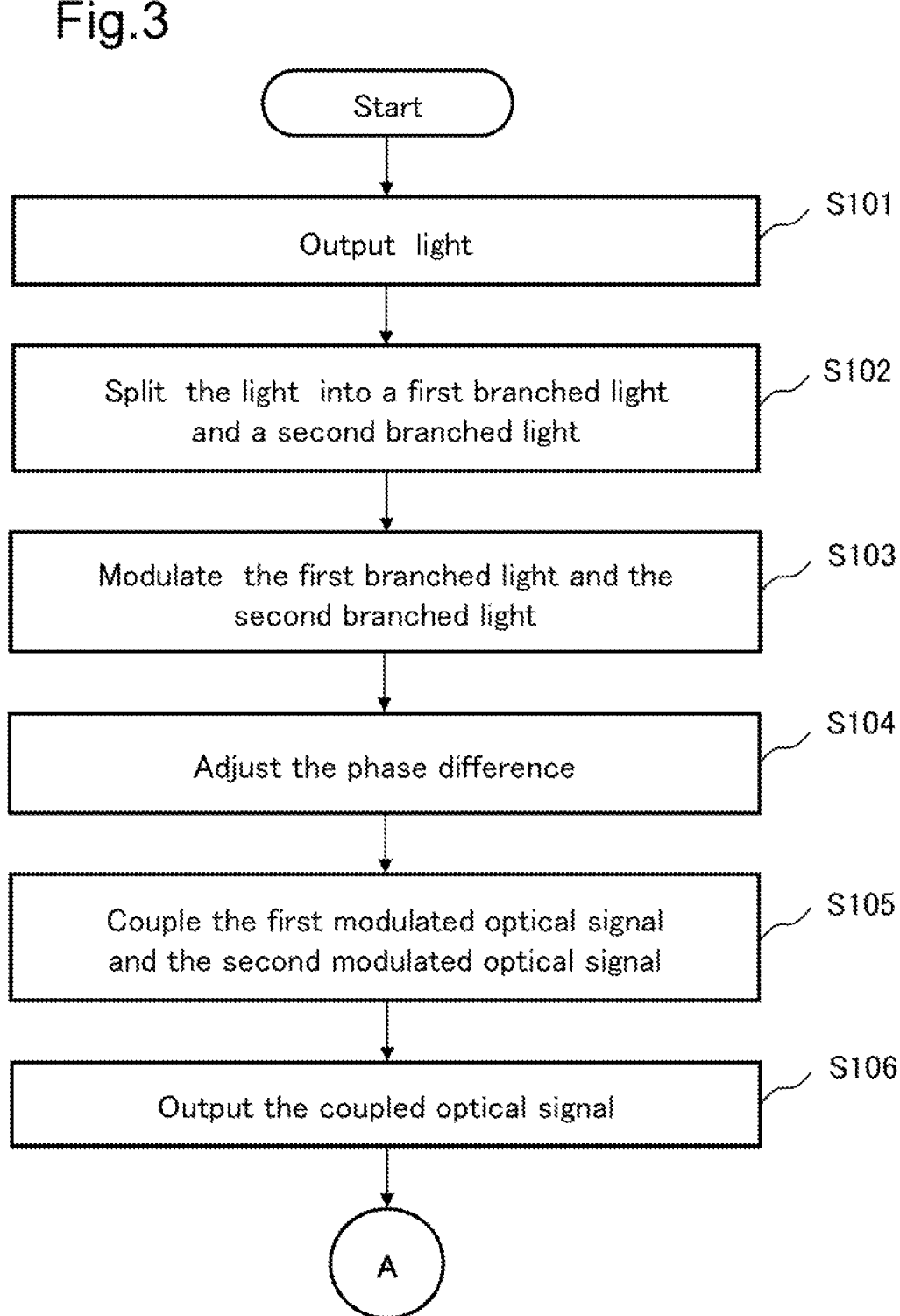
FIG. 3 is a flowchart for explaining an operation of the optical transmitter in accordance with a first example embodiment of the present invention.
Figure 4:
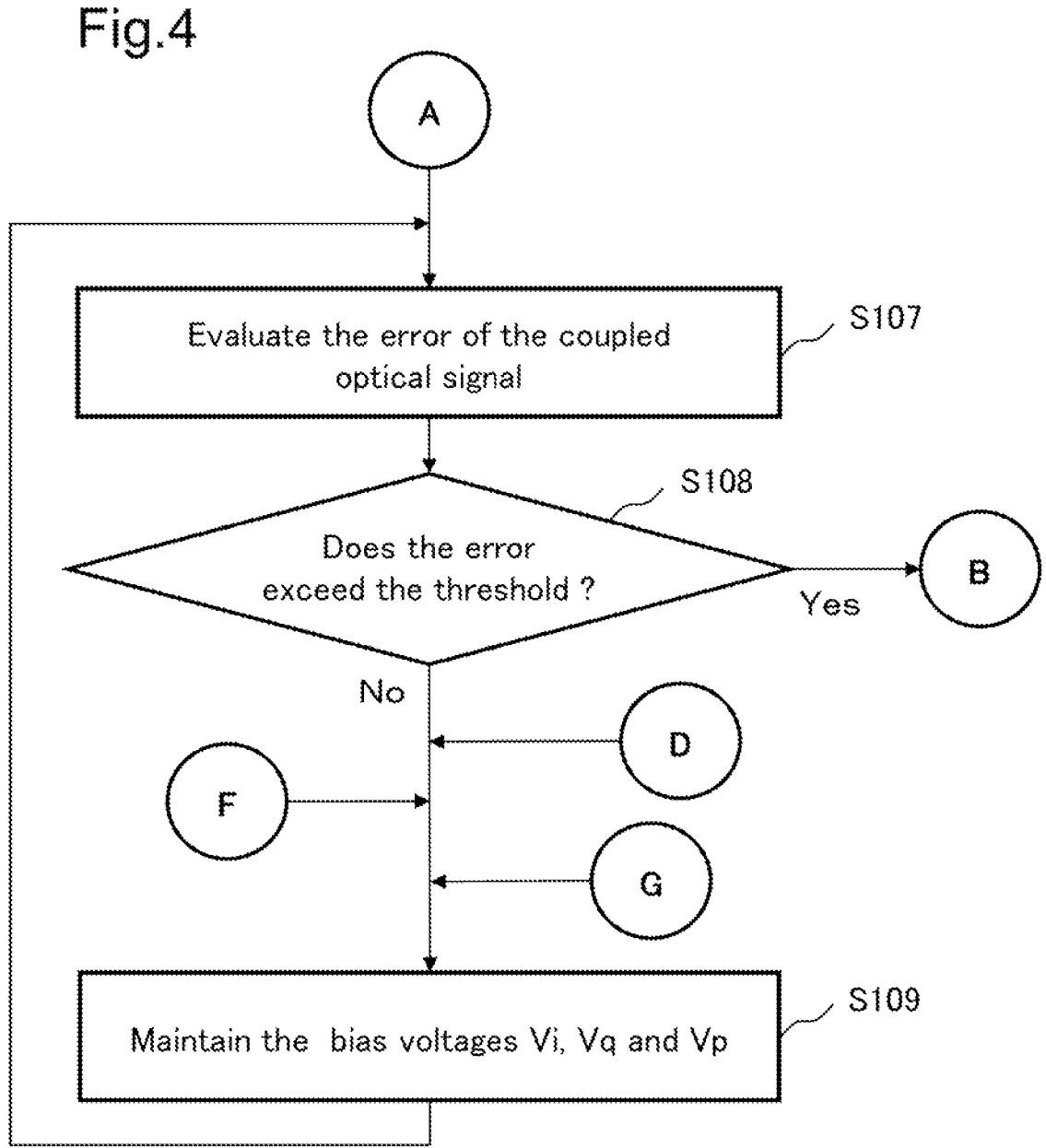
FIG. 4 is a flowchart for explaining an operation of the optical transmitter in accordance with a first example embodiment of the present invention.
Figure 5:
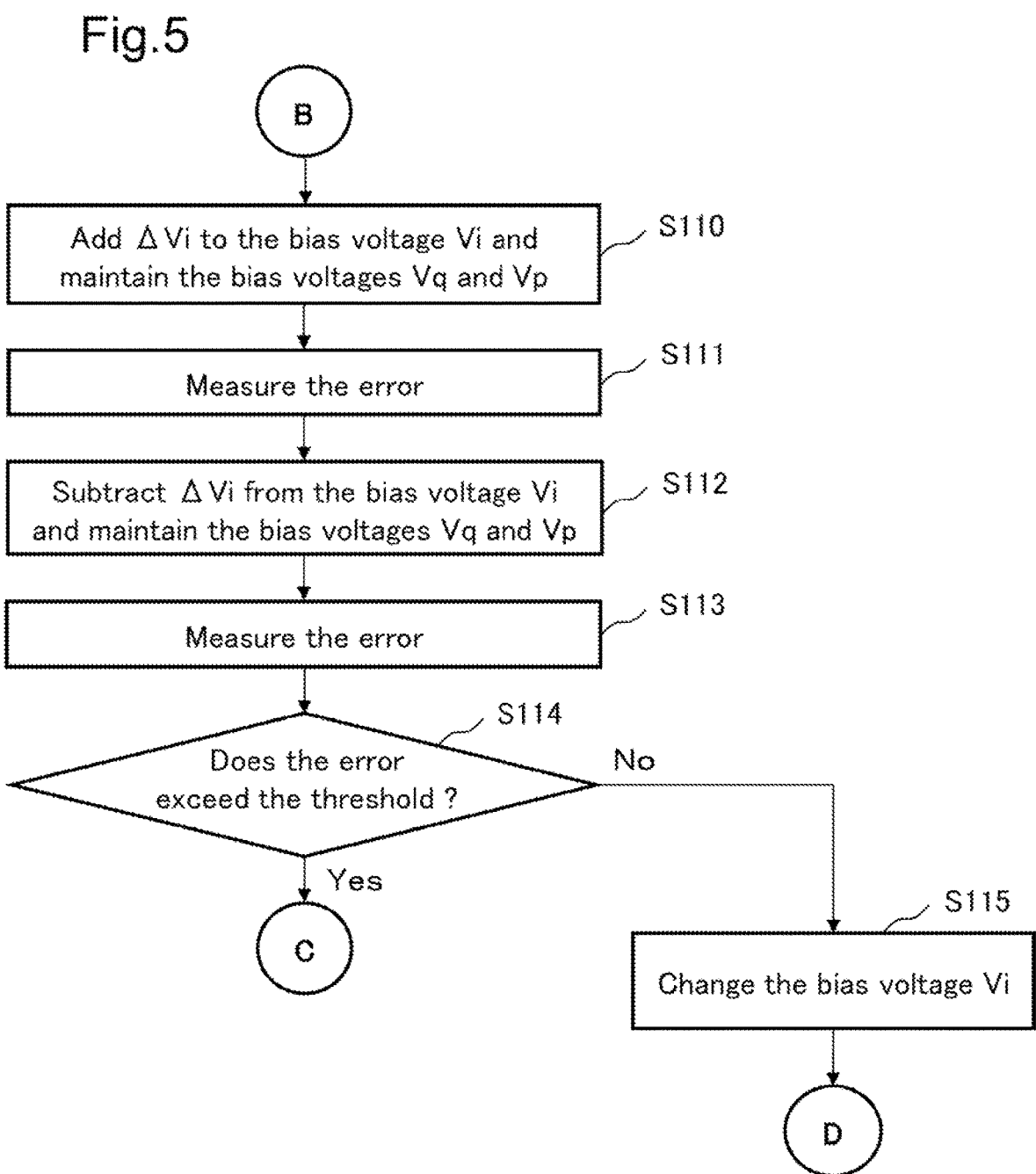
FIG. 5 is a flowchart for explaining an operation of the optical transmitter in accordance with a first example embodiment of the present invention.
Figure 6:
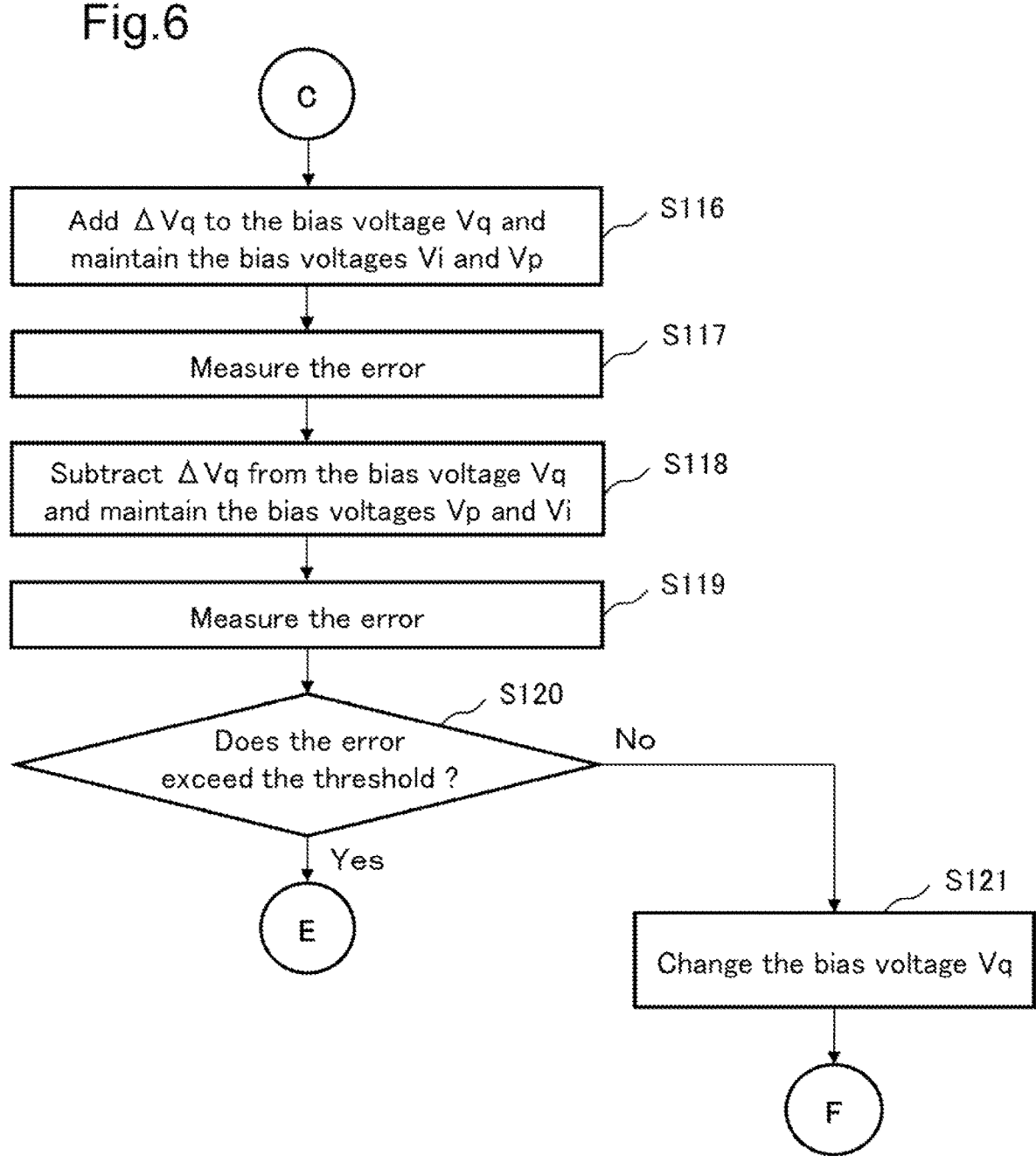
FIG. 6 is a flowchart for explaining an operation of the optical transmitter in accordance with a first example embodiment of the present invention.
Figure 7:
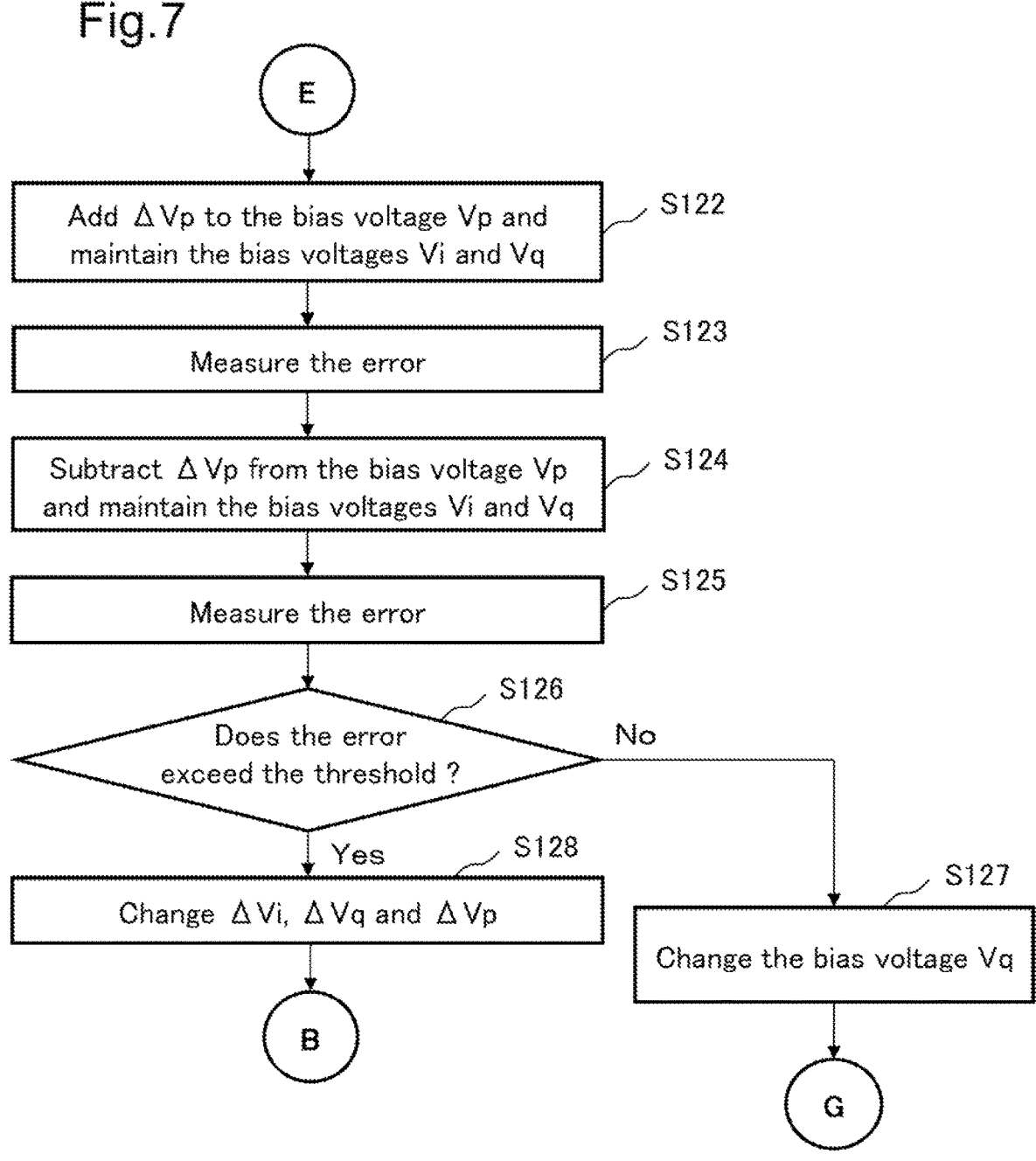
FIG. 7 is a flowchart for explaining an operation of the optical transmitter in accordance with a first example embodiment of the present invention.

An optical transmitter 1 is explained based on the FIG. 1. FIG. 1 is a block diagram illustrating a configuration example of the optical transmitter 1. The optical transmitter 1 outputs a modulated optical signal. For example, the optical transmitter 1 outputs a Quadrature Amplitude Modulation (QAM) optical signal.

As shown in FIG. 1, the optical transmitter 1 comprises a light source 10, a quadrature modulator 20, a digital signal processor (DSP) 30, an amplifier (AMP) 35, a photo detector 40, an analog to digital converter (ADC) 45, an error evaluator 50, a bias controller 55, a bias generator 60 and a digital to analog converter (DAC) 65.

The light source 10 outputs a continuous light. For example, the light source 10 is a laser diode. The light source 10 is connected to the quadrature modulator 20.

Figure 2:
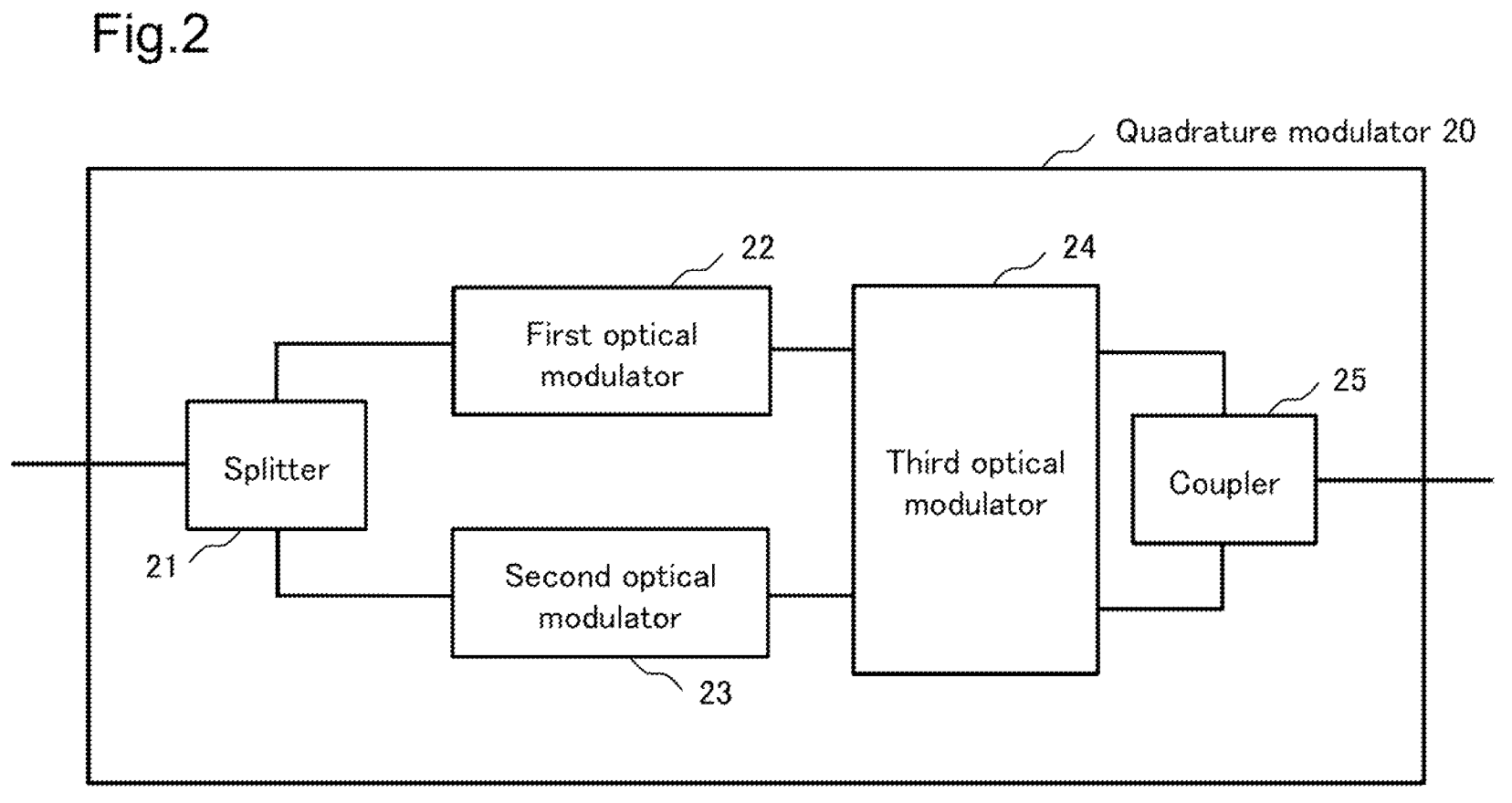

FIG. 2 is a block diagram illustrating a configuration example of the quadrature modulator 20. As shown in FIG. 2, the quadrature modulator 20 comprises a splitter 21, a first optical modulator 22, a second optical modulator 23, a third optical modulator 24 and a coupler 25.

As shown in FIG. 1, the quadrature modulator 20 is connected with the light source 10 and the DAC 65. The quadrature modulator 20 modulates the light from the light source 10 and outputs the QAM optical signal to the outside of the optical transmitter 1.

The splitter 21 splits the light from the light source 10 into a first branched light and a second branched light. The splitter 21 outputs the first branched light to the first optical modulator 22. The splitter 21 outputs the second branched light to the second optical modulator 23.

The first optical modulator 22 modulates the first branched light and outputs a first modulated optical signal. The first optical modulator 22 is connected to the splitter 21, the third optical modulator 24 and DAC 65. For example, the first optical modulator 22 is a Mach-Zehnder modulator (MZM). The first optical modulator 22 uses an amplitude modulation scheme. The first optical modulator 22 modulates the first branched light based on the bias voltage (Vi described later) applied by the DAC 65 and a drive signal from the AMP 35.

The second optical modulator 23 modulates the second branched light and outputs a second modulated optical signal. The second optical modulator 23 is connected to the splitter 21, the third optical modulator 24 and DAC 65. For example, the second optical modulator 23 is a MZM. The second optical modulator 23 uses an amplitude modulation scheme. The second optical modulator 23 modulates the second branched light based on the bias voltage (Vq described later) applied by the DAC 65 and a drive signal from the AMP 35.

The third optical modulator 24 adjusts a phase difference between the first modulated optical signal and the second modulated optical signal. The third optical modulator 24 is connected to the first optical modulator 22, the second optical modulator 23, the coupler 25 and the DAC 65. For example, the third optical modulator 24 is a Mach-Zehnder interferometer (MZI). The third optical modulator 24 adjusts the phase difference between the first modulated optical signal and the second modulated optical signal based on a bias voltage (Vp described later) applied by the DAC 65. Specifically, the third optical modulator 24 adjusts a phase difference so that the first modulated optical signal and the second modulated optical signal are orthogonal to each other.

The coupler 25 couples the first modulated optical signal and the second optical modulated signal and outputs a coupled optical signal.

The DSP 30 outputs an In-phase signal and a Quadrature signal to the AMP 35 based on the data stream from a client device not shown. The AMP 35 amplifies the In-phase signal and the Quadrature signal. The AMP 35 further outputs the In-phase signal and the Quadrature signal to each of the first optical modulator 22 and the second optical modulator 23, as the drive signal.

The photo detector 40 converts the coupled optical signal from the quadrature modulator 20 into an analog signal and outputs the analog signal to the ADC 45. The ADC 45 converts the analog signal into a digital signal and outputs the digital signal to the error evaluator 50.

The error evaluator 50 measures a modulation error ratio (MER) of the digital signal from the ADC 45. The error evaluator 50 further judges whether the MER is less than a predetermined threshold value or not. Specifically, the error evaluator 50 previously stores an ideal constellation for QAM scheme. The error evaluator 50 measures a MER of the digital signal by comparing the ideal constellation and a constellation generated from the digital signal. The error evaluator 50 judges whether the MER is less than a predetermined threshold value or not and outputs result of the judgement to the bias controller 55.

The bias controller 55 sets values of bias voltages Vi, Vq and Vp in response to the result of the judgement from the error evaluator 50. The bias controller 55 changes the values of bias voltages Vi, Vq and Vp when the result of the judgement indicates the MER exceeds a predetermined threshold value. The bias controller 55 maintains the values of bias voltages Vi, Vq and Vp when the result of the judgement indicates the MER is less than a predetermined threshold value. Detail of the bias controller 55 is described later.

The bias generator 60 acquires values of bias voltages Vi, Vq and Vp. The bias generator applies voltages to the DAC 65, the amplitude of the voltages corresponding to the bias voltages Vi, Vq and Vp. The DAC 65 converts the voltages applied from the bias generator into analog signals and applies the analog signals into the quadrature modulator 20. Specifically, the DAC 65 applies the voltage corresponding to the bias voltage Vi into the first optical modulator 22. The DAC 65 applies the voltage corresponding to the bias voltage Vq into the second optical modulator 23. The DAC 65 applies the voltage corresponding to the bias voltage Vp into the third optical modulator 24.

Next, an operation of the optical transmitter 1 is described based on FIG. 3, FIG. 4 FIG. 5, FIG. 6 and FIG. 7. FIGS. 3 to 7 are flowcharts indicating the operation of the optical transmitter 1.

First, the light source 10 output the light to the quadrature modulator 20 (S101). The splitter 21 in the quadrature modulator 20 splits the light into the first branched light and the second branched light (S102). The first optical modulator 22 modulates the first branched light and the second optical modulator 23 modulates the second branched light (S103). Then, the first optical modulator 22 outputs the first modulated optical signal. The second optical modulator 23 outputs the second modulated optical signal.

The third optical modulator 24 adjusts the phase difference between the first modulated optical signal and the second modulated optical signal (S104). The coupler 25 couples the he first modulated optical signal and the second modulated optical signal (S105). The quadrature modulator 20 outputs the coupled optical signal including the first modulated optical signal and the second modulated optical signal (S106).

The error evaluator 50 evaluates the error of the coupled optical signal from the quadrature modulator 20 (S107). Specifically, the error evaluator 50 measures the MER from the coupled optical signal. The error evaluator 50 judges whether the MER is less than a predetermined threshold value or not (S108). The bias controller 55 maintains the values of the bias voltages Vi, Vq and Vp, when the measured MER does not exceed the threshold value ("No" in S108). When specific time is passed after the bias controller 55 maintains the values (S109), the error evaluator 50 evaluates the error of the coupled optical signal again (S107).

The bias controller 55 adds ΔVi to the value of the bias voltage Vi and maintains the values of the bias voltage Vq and Vp (S110), when the measured MER exceeds the threshold ("Yes" in S108). In other words, the bias controller 55 adjusts the adjusted voltage (the bias voltage Vi) when the error exceeds a threshold. The value of the ΔVi is predetermined. On the process of S110, the bias controller 55 gives the value Vi increased by ΔVi to the bias generator 60. The error evaluator 50 measures the MER of the coupled optical signal while the bias voltage Vi increased by ΔVi is applied to the first optical modulator 22 (S111).

The bias controller 55 subtracts ΔVi from the value of the bias voltage Vi and maintains the values of the bias voltage Vq and Vp (S112). On the process of S112, the bias controller 55 gives the value Vi decreased by ΔVi to the bias generator 60. The error evaluator 50 measures the MER of the coupled optical signal, while the bias voltage Vi corresponding to the increased value is applied to the first optical modulator 22 (S113).

The error evaluator 50 further judges whether the MER measured is less than a predetermined threshold value or not (S114). Specifically, the error evaluator 50 compares the threshold and the MER which is smaller one of the MER measured on S111 and the MER measured on S113. The bias controller 55 changes the value of the bias voltage Vi (S115) when the MER does not exceed the threshold ("No" in S114). The bias controller 55 changes the value of the bias voltage Vi to the value of the bias voltage Vi applied when the MER compared to the threshold is detected ("No" in S114). For example, the bias voltage Vi increases by ΔVi on the S115, when the error evaluator 50 compares the threshold and the MER measured on the S111. After the S115, the bias controller 55 maintains the bias voltages Vi, Vq and Vp (S109). In other words, the bias controller 55 maintains the bias voltage Vi after the bias voltage Vi is adjusted when the error of the coupled optical signal does not exceed the threshold by adjusting the bias voltage Vi at S110 and S112.

The bias controller 55 adds ΔVq to the value of the bias voltage Vq and maintains the values of the bias voltage Vi and Vp (S116), when the measured MER exceeds the threshold ("Yes" in S114). In other words, the bias controller 55 adjusts the adjusted voltage (the bias voltage Vq) when the error exceeds a threshold. The value of the ΔVq is predetermined. On the process of S116, the bias controller 55 gives the value Vq increased by ΔVq to the bias generator 60. The error evaluator 50 measures the MER of the coupled optical signal while the bias voltage Vq increased by ΔVq is applied to the second optical modulator 23 (S117).

The bias controller 55 subtracts ΔVq from the value of the bias voltage Vq and maintains the values of the bias voltage Vi and Vp (S118). On the process of S118, the bias controller 55 give the value Vq decreased by ΔVq to the bias generator 60. The error evaluator 50 measures the MER of the coupled optical signal, while the bias voltage Vq corresponding to the increased value is applied to the second optical modulator 23 (S119).

The error evaluator 50 further judges whether the MER measured is less than a predetermined threshold value or not (S120). Specifically, the error evaluator 50 compares the threshold and the MER which is smaller one of the MER measured on S117 and the MER measured on S119. The bias controller 55 changes the value of the bias voltage Vq (S121) when the MER does not exceed the threshold ("No" in S120). The bias controller 55 changes the value of the bias voltage Vq to the value of the bias voltage Vq applied when the MER compared to the threshold is detected. For example, the bias voltage Vq increases by ΔVq on the S121, when comparing the threshold and the MER measured on the S117. After the S121, the bias controller 55 maintains the bias voltages Vi, Vq and Vp (S109). In other words, the bias controller 55 maintains the bias voltage Vq after the bias voltage Vq is adjusted when the error of the coupled optical signal does not exceed the threshold by adjusting the bias voltage Vq at S116 and S118.

The bias controller 55 adds ΔVp to the value of the bias voltage Vp and maintains the values of the bias voltage Vi and Vq (S122), when the measured MER exceeds the threshold ("Yes" in S120). In other words, the bias controller 55 adjusts the adjusted voltage (the bias voltage Vp) when the error exceeds a threshold. The value of the ΔVp is predetermined. On the process of S122, the bias controller 55 give the value Vp increased by ΔVp to the bias generator 60. The error evaluator 50 measures the MER of the coupled optical signal while the bias voltage Vp increased by ΔVp is applied to the third optical modulator 24 (S123).

The bias controller 55 subtracts ΔVp from the value of the bias voltage Vp and maintains the values of the bias voltage Vi and Vq (S124). On the process of S124, the bias controller 55 gives the value Vp decreased by ΔVp to the bias generator 60. The error evaluator 50 measures the MER of the coupled optical signal, while the bias voltage Vp corresponding to the increased value is applied to the third optical modulator 24 (S125).

The error evaluator 50 further judges whether the MER measured is less than a predetermined threshold value or not (S126). Specifically, the error evaluator 50 compares the threshold and the MER which is smaller one of the MER measured on S123 and the MER measured on S125. The bias controller 55 changes the value of the bias voltage Vp (S127) when the MER does not exceed the threshold ("No" in S126). The bias controller 55 changes the value of the bias voltage Vp to the value of the bias voltage Vp applied when the MER compared to the threshold is detected. For example, the bias voltage Vp increases by ΔVp on the S121, when comparing the threshold and the MER measured on the S123. After the S127, the bias controller 55 maintains the bias voltages Vi, Vq and Vp (S109). In other words, the bias controller 55 maintains the bias voltage Vp after the bias voltage Vp is adjusted when the error of the coupled optical signal does not exceed the threshold by adjusting the bias voltage Vp at S122 and S124.

The bias controller 55 changes the values of ΔVi, ΔVq and ΔVp, when the MER exceeds the threshold (S128). For example, the bias controller 55 changes the values of ΔVi, ΔVq and ΔVp by a predetermined value or at random. The bias controller 55 adds ΔVi to the value of the bias voltage Vi and maintains the values of the bias voltage Vq and Vp (S110) after the process of S128. The operation of transmitter 1 is described as above. On above description of the operation, the transmitter 1 adjusts the bias voltages in order of bias voltage Vi, Vp, Vq, but an order is not limited to this order.

As above, the optical transmitter 1 comprises the light source 10, the first optical modulator 22, the second optical modulator 23, the third optical modulator 24, the coupler 25 and the controller. The controller is combination of the PD 40, the ADC 45, the error evaluator 50, the bias controller 55, the bias generator 60 and DAC 65.

The light source 10 outputs light. The splitter 21 splits the light from the light source to a first branched light and a second branched light. The first optical modulator 22 modulates the first branched light and outputs a first modulated optical signal. The second optical modulator 23 modulates the second branched light and outputs a second modulated optical signal. The third optical modulator 24 adjusts a phase difference between the first modulated optical signal and the second modulated optical signal. A coupler 25 couples the first modulated optical signal and the second modulated optical signal and outputs a coupled optical signal. The controller adjusts an adjusted bias voltage based on the coupled optical signal, the adjusted bias voltage being one of a first bias voltage (the bias voltage Vi) applied to the first optical modulator 22, a second bias voltage (the bias voltage Vq) applied to the second optical modulator 23 and a third bias voltage (the bias voltage Vp) applied to the third optical modulator 24. The controller further maintains a value of bias voltages other than the adjusted voltage in the first bias voltage, the second bias voltage and the third voltage.

The optical transmitter 1 outputs the coupled optical signal while maintaining the value of bias voltages other than the adjusted voltage. The optical transmitter 1 also adjusts the adjusted voltage based on the coupled optical signal. The optical transmitter 1 can adjust individually the bias voltages applied to the optical modulators based on the coupled optical signal because the coupled optical signal is affected only by the adjusting to the adjusted voltage. As a result, the optical transmitter 1 is simple because it is not necessary to arrange photodetectors for all optical modulator.

For example, the optical transmitter 1 outputs the coupled optical signal while adjusting the bias voltage Vi and maintaining the bias voltage Vq and Vp from the process of S110 to S113. The optical transmitter 1 also adjusts the voltage Vi based on the coupled optical signal. The optical transmitter 1 can adjust individually the bias voltage Vi based on the coupled optical signal because the coupled optical signal is affected only by the adjusting to the bias voltage Vi. The transmitter 1 does not need photodetectors for the first optical modulator 22, the second optical modulator 23 and the third optical modulator 24, because of adjusting similarly the bias voltage Vq and Vp based on the coupled optical signal. As a result, the optical transmitter 1 is simple.

Next, an optical transmitter 1A is described. The optical transmitter 1A is a modified example of the optical transmitter 1. The structure and the operation in the optical transmitter 1A is same as the optical transmitter 1. The optical transmitter 1A is different from the optical transmitter 1 on performing an additional process.

Figure 8:
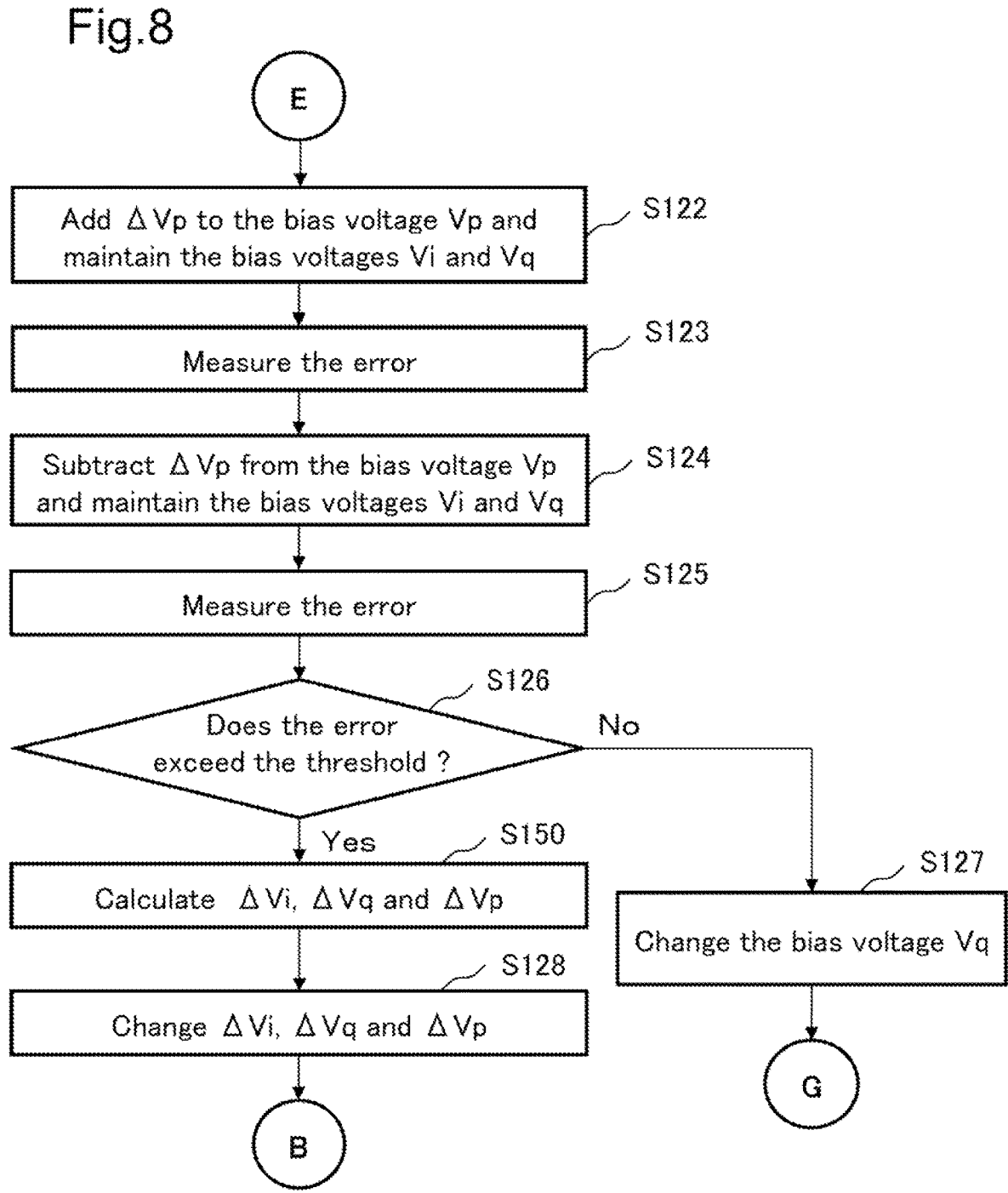
FIG. 8 is a flowchart for explaining an operation of the modification example of the optical transmitter in accordance with a first example embodiment of the present invention.

FIG. 8 is flowchart indicating the operation including the additional process on the optical transmitter 1. As indicated in FIG. 8, the bias controller 55 calculates the value of ΔVi, ΔVq, ΔVp when the error exceeds the threshold S126 of the optical transmitter 1A ("Yes" of S126).

Specifically, the bias controller 55 updates the value of ΔVi, ΔVq, ΔVp based on the characteristics of the optical transmitter 1A. The bias controller 55 stores coefficients set to each of characteristic of the optical transmitter 1A in advance. For example, the characteristic of the optical transmitter 1A indicates a used time for the optical transmitter 1A, a temperature in the optical transmitter 1A, a value of root mean square (RMS) of the driving signal applied to the quadrature modulator 20 from the AMP 35, the value of ΔVi, ΔVq, ΔVp before S150 and the value of the bias voltage Vi, Vq, Vp. The bias controller 55 calculates sum of the value which is obtained by multiplying the coefficient by the value of the characteristics, as new ΔVi. The characteristics of the optical transmitter 1A are not limited to those mentioned above.

The used time is obtained by the timer not shown in Figures, the timer monitoring time from inputting power into the optical transmitter 1. The temperature is obtained by a temperature sensor not shown in Figures. The RMS is obtained by the bias controller 55 monitoring the voltage applied to the quadrature modulator 20 from the Amp 35.

According to Ridge regression analysis, bias controller 55 may further calculate the new ΔVi by using a L2 norm based on the coefficients for the value calculated. According to Lasso regression analysis, bias controller 55 may further calculate the new ΔVi by using a L1 norm based on the coefficients for the value calculated.

The bias controller 55 further calculates new ΔVq based on the temperature, the used time, the value of RMS of the driving signal applied to the second optical modulator 23, the value of ΔVq before S150 and the value of the bias voltage Vq. The bias controller 55 further calculates new ΔVp based on the temperature, the used time, the value of ΔVp before S150 and the value of the bias voltage Vp.

The bias controller 55 changes the value of ΔVi, ΔVq, ΔVp to the value of new ΔVi, ΔVq, ΔVp calculated in S150 (S128). As above, the operation of the optical transmitter 1A is described.

As above description, the bias controller 55 updates the amount of change (ΔVi, ΔVp, ΔVq) based on the the characteristics of the optical transmitter TA. Thereby, the optical transmitter TA reduces a number of the process for making the error smaller because the transmitter TA can adjust the bias voltage by an optimal optical amount of change.

Second Example Embodiment

Figure 9:
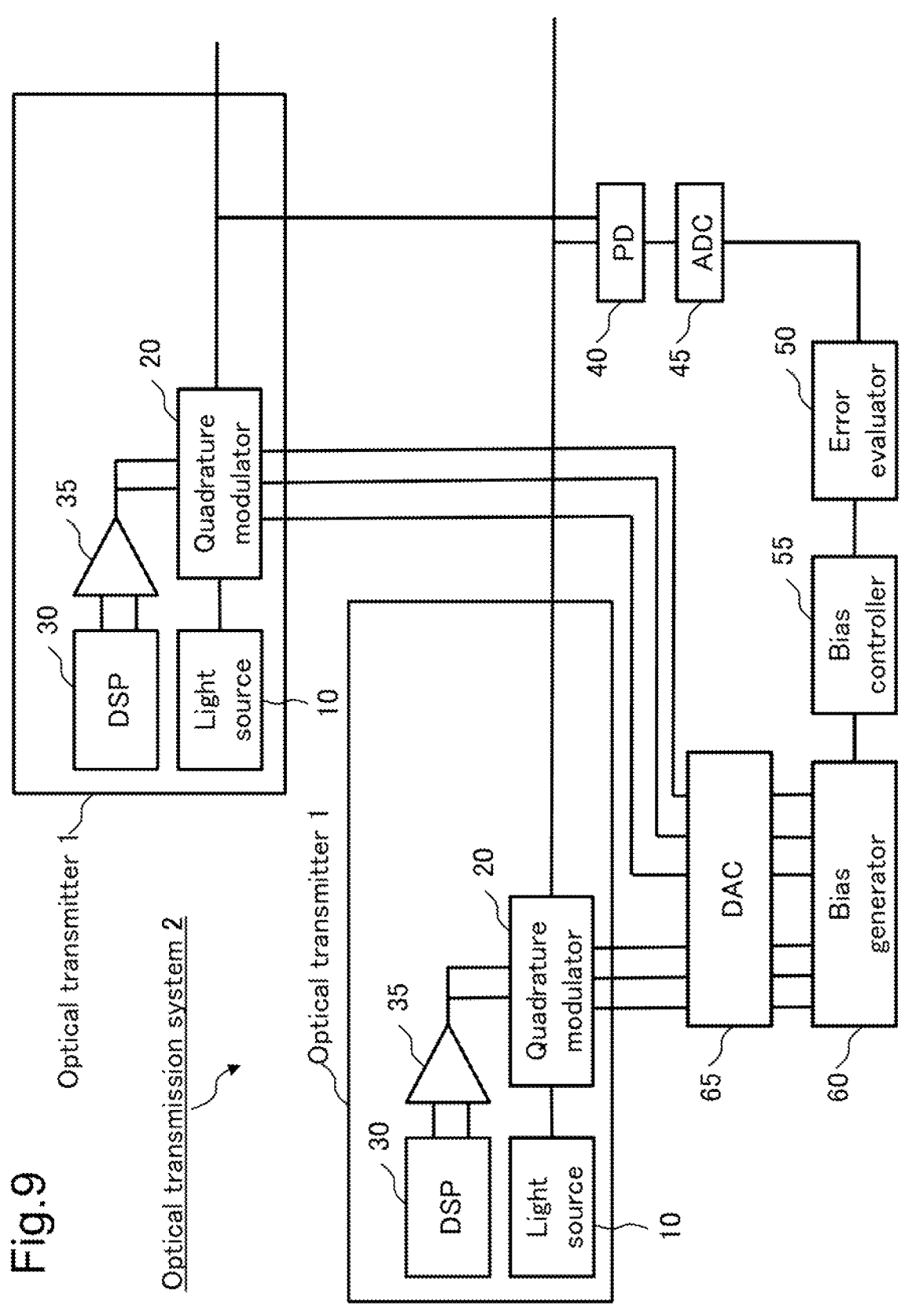
FIG. 9 is a block diagram illustrating configuration example of an optical transmitter in accordance with a second example embodiment of the present invention.

An optical transmission system 2 on the second example embodiment is described based on FIG. 9. FIG. 9 is a block diagram illustrating a configuration example of the optical transmission system 2. The optical transmission system 2 comprises two optical transmitters 1, PD 40, ADC45, the error evaluator 50, the bias controller 55, the bias generator 60 and DAC 65. The optical transmitter 1 comprises the light source 10, the quadrature modulator 20, DSP 30 and AMP 35. PD 40 and DAC 65 is connected with two optical transmitters 1. The optical transmission system 2 is different from the optical transmitter 1 on comprising an additional optical transmitter 1.

The optical transmission system 2 performs the operation described on the first example embodiment for two optical transmitters 1. Specifically, the optical transmission system 2 performs the processes from S101 to S128 by using one of the optical transmitter 1. Then, the optical transmission system 2 starts to evaluate the error of the coupled optical signal from other optical transmitter 1 when the error of the coupled optical signal from one optical transmitter 1 does not exceed the threshold. Specifically, the optical transmission system 2 evaluates the error of the coupled optical signal from the other optical transmitter 1 on S107 after performing process on S109 by using one optical transmitter 1.

As above, the optical transmission system 2 is described. On above description of the operation, the transmitter TA adjusts the bias voltages in order of bias voltage Vi, Vp, Vq, but an order is not limited to this order. The optical transmission system 2 comprises a structure like the optical transmitter 1. As a result, the optical transmission system 2 is simple because it is not necessary to arrange photodetectors for all optical modulator like the optical transmitter 1.

Third Example Embodiment

Figure 10:
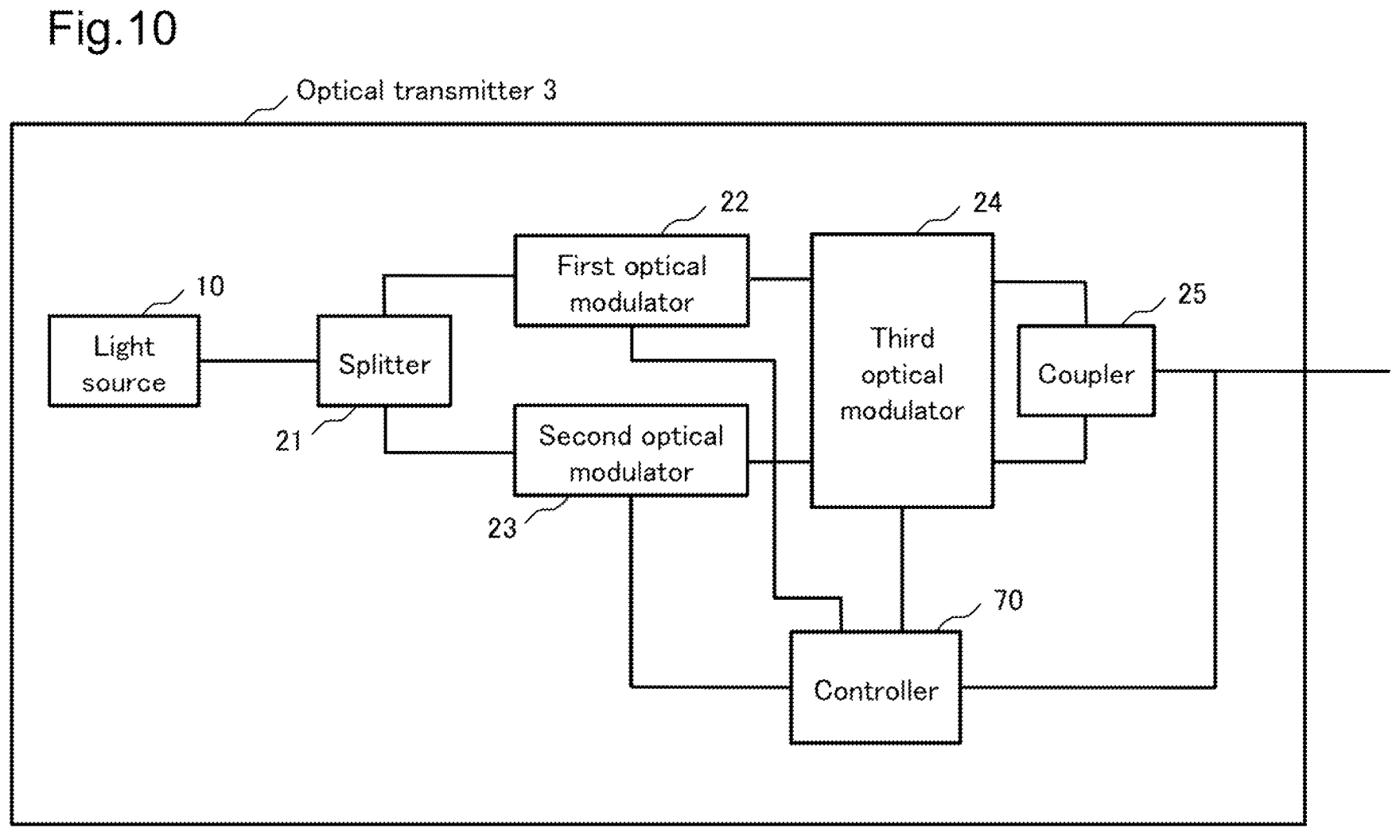

An optical transmitter 3 on the third example embodiment is described based on FIG. 10. FIG. 10 is a block diagram illustrating a configuration example of the optical transmitter 3. The optical transmitter 3 comprises the light source 10, the first optical modulator 22, the second optical modulator 23, the third optical modulator 24, the coupler 25 and the controller 70.

The light source 10 outputs light. The splitter 21 splits the light from the light source to a first branched light and a second branched light. The first optical modulator 22 modulates the first branched light and outputs a first modulated optical signal. The second optical modulator 23 modulates the second branched light and outputs a second modulated optical signal. The third optical modulator 24 adjusts a phase difference between the first modulated optical signal and the second modulated optical signal. A coupler 25 couples the first modulated optical signal and the second modulated optical signal and outputs a coupled optical signal. The controller 70 adjusts an adjusted bias voltage based on the coupled optical signal, the adjusted bias voltage being one of a first bias voltage (the bias voltage Vi) applied to the first optical modulator 22, a second bias voltage (the bias voltage Vq) applied to the second optical modulator 23 and a third bias voltage (the bias voltage Vp) applied to the third optical modulator 24. The controller 70 further maintains a value of bias voltages other than the adjusted voltage in the first bias voltage, the second bias voltage and the third voltage.

Next, an operation of the transmitter 3 is described based on FIG. 11. FIG. 11 is flowchart indicating the operation of the transmitter 3. First, the light source 10 outputs the light to the quadrature modulator 20 (S201). The splitter in the quadrature modulator 20 splits the light into the first branched light and the second branched light (S202). The first optical modulator 22 modulates the first branched light and the second optical modulator 23 modulates the second branched light (S203). Then, the first optical modulator 22 outputs the first modulated optical signal. The second optical modulator 23 outputs the second modulated optical signal The third optical modulator 24 adjusts the phase difference between the first modulated optical signal and the second modulated optical signal (S204). The coupler 25 couples the first modulated optical signal and the second modulated optical signal (S205). The quadrature modulator 20 outputs the coupled optical signal including the first modulated optical signal and the second modulated optical signal (S206). The controller 70 adjusts an adjusted bias voltage based on the coupled optical signal and maintains a value of bias voltages other than the adjusted voltage in the first bias voltage, the second bias voltage and the third voltage (S207).

As above, the optical transmitter 3 is described. The optical transmitter 3 comprises a structure like the optical transmitter 1. As a result, the optical transmitter 3 is simple because it is not necessary to arrange photodetectors for all optical modulator like the optical transmitter 1.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical transmitter comprising:
   a light source configured to output light;
   a splitter configured to split the light to a first branched light and a second branched light;
   a first optical modulator configured to modulate the first branched light and output a first modulated optical signal;
   a second optical modulator configured to modulate the second branched light and output a second modulated optical signal;
   a third optical modulator configured to adjust a phase difference between the first modulated optical signal and the second modulated optical signal;
   a coupler configured to couple the first modulated optical signal and the second modulated optical signal and output a coupled optical signal; and
   a controller configured to adjust an adjusted bias voltage based on the coupled optical signal, the adjusted bias voltage being one of a first bias voltage applied to the first optical modulator, a second bias voltage applied to the second optical modulator and a third bias voltage applied to the third optical modulator,
   wherein the controller is configured to:
     maintain a value of bias voltages other than the adjusted voltage in the first bias voltage, the second bias voltage and the third bias voltage;
     measure an error of the coupled optical signal by using a modulation error ratio (MER);
     adjust the adjusted voltage when the error exceeds a threshold; and
     maintain a value of the adjusted bias voltage when the error of the coupled optical signal does not exceed the threshold while adjusting for the adjusted bias voltage.

2. The optical transmitter according to claim 1, wherein the controller is configured to increase and decrease the value of the adjusted bias voltage by an amount of change.

3. The optical transmitter according to claim 2, wherein the controller is configured to calculate the amount of change based on one of the first bias voltage, the second bias voltage and the third bias voltage.

4. The optical transmitter according to claim 2, wherein the controller is configured to calculate the amount of change based on temperature of the optical transmitter.

5. The optical transmitter according to claim 2, wherein the controller is configured to calculate the amount of change based on a value of a root mean square (RMS) of a driving signal for modulating the first branched light or a value of RMS of a driving signal for modulating the second branched light.

6. The optical transmitter according to claim 2, wherein the controller is configured to calculate the amount of change based on a used time of the optical transmitter.

7. The optical transmitter according to claim 3, wherein the controller is configured to calculate the amount of change based on temperature of the optical transmitter.

8. The optical transmitter according to claim 3, wherein the controller is configured to calculate the amount of change based on a value of root mean square (RMS) of a driving signal for modulating the first branched light or a value of RMS of a driving signal for modulating the second branched light.

9. The optical transmitter according to claim 3, wherein the controller is configured to calculate the amount of change based on a used time of the optical transmitter.

10. The optical transmitter according to claim 4, wherein the controller is configured to calculate the amount of change based on a value of root mean square (RMS) of a driving signal for modulating the first branched light or a value of RMS of a driving signal for modulating the second branched light.

11. The optical transmitter according to claim 4, wherein the controller is configured to calculate the amount of change based on a used time of the optical transmitter.

12. The optical transmitter according to claim 5, wherein the controller is configured to calculate the amount of change based on a used time of the optical transmitter.

13. An optical transmission method comprising:

outputting light;

splitting the light to a first branched light and a second branched light;

modulating the first branched light and outputting a first modulated optical signal by a first optical modulator;

modulating the second branched light and outputting a second modulated optical signal by a second optical modulator;

adjusting a phase difference between the first modulated optical signal and the second modulated optical signal by a third optical modulator;

coupling the first modulated optical signal and the second modulated optical signal and outputting a coupled optical signal;

adjusting an adjusted bias voltage based on the coupled optical signal, the adjusted bias voltage being one of a first bias voltage applied to the first optical modulator, a second bias voltage applied to the second optical modulator and a third bias voltage applied to the third optical modulator;

maintaining a value of bias voltages other than the adjusted voltage in the first bias voltage, the second bias voltage and the third bias voltage;

measuring an error of the coupled optical signal by using a modulation error ratio (MER);

adjusting the adjusted voltage when the error exceeds a threshold; and maintaining a value of the adjusted bias voltage when the error of the coupled optical signal does not exceed the threshold while adjusting for the adjusted bias voltage.

\* \* \* \* \*